(12) United States Patent
Ragot

(10) Patent No.: US 8,997,567 B2
(45) Date of Patent: Apr. 7, 2015

(54) METHOD OF ANGULAR MEASUREMENT BY MEANS OF A VIBRATING SENSOR TO WHICH MODULATED CONTROLS ARE APPLIED

(75) Inventor: Vincent Ragot, Paris (FR)

(73) Assignee: Sagem Defense Securite, Paris (FR)

( * ) Notice: Subject to any disclaimer, the term of this patent is extended or adjusted under 35 U.S.C. 154(b) by 143 days.

(21) Appl. No.: 13/581,787

(22) PCT Filed: Mar. 23, 2011

(86) PCT No.: PCT/EP2011/001430
§ 371 (c)(1),
(2), (4) Date: Aug. 29, 2012

(87) PCT Pub. No.: WO2011/116941
PCT Pub. Date: Sep. 29, 2011

(65) Prior Publication Data
US 2013/0000405 A1  Jan. 3, 2013

(30) Foreign Application Priority Data
Mar. 23, 2010  (FR) ...................... 10 01158

(51) Int. Cl.
*G01C 19/00* (2013.01)
*G01C 19/567* (2012.01)

(52) U.S. Cl.
CPC .................................... *G01C 19/567* (2013.01)

(58) Field of Classification Search
CPC . G01C 19/567; G01C 19/5684; G01C 25/005
USPC ............... 73/504.02, 504.04, 504.12, 504.13, 73/504.16
See application file for complete search history.

(56) References Cited

U.S. PATENT DOCUMENTS

| | | | | |
|---|---|---|---|---|
| 3,463,016 A * | 8/1969 | Erdley et al. ..................... 74/5.4 |
| 5,616,864 A * | 4/1997 | Johnson et al. ............. 73/504.04 |
| 5,712,427 A * | 1/1998 | Matthews .................. 73/504.04 |
| 5,894,090 A * | 4/1999 | Tang et al. ................. 73/504.02 |
| 6,044,705 A * | 4/2000 | Neukermans et al. ..... 73/504.02 |
| 6,164,134 A * | 12/2000 | Cargille ...................... 73/504.02 |
| 6,182,352 B1 * | 2/2001 | Deschenes et al. ........... 29/602.1 |
| 6,263,552 B1 * | 7/2001 | Takeuchi et al. ............. 29/25.35 |
| 6,282,958 B1 * | 9/2001 | Fell et al. ................... 73/504.13 |
| 6,289,733 B1 * | 9/2001 | Challoner et al. .......... 73/504.12 |
| 6,367,786 B1 * | 4/2002 | Gutierrez et al. ............. 267/136 |
| 6,481,285 B1 * | 11/2002 | Shkel et al. ................. 73/504.13 |
| 6,515,278 B2 * | 2/2003 | Wine et al. ..................... 250/234 |
| 6,628,177 B2 * | 9/2003 | Clark et al. .................... 333/186 |
| 6,629,460 B2 * | 10/2003 | Challoner .................. 73/504.02 |
| 6,856,217 B1 * | 2/2005 | Clark et al. .................... 333/186 |
| 6,944,931 B2 * | 9/2005 | Shcheglov et al. ............. 29/595 |
| 6,945,109 B2 * | 9/2005 | Renault et al. ............. 73/504.13 |
| 7,040,163 B2 * | 5/2006 | Shcheglov et al. ........ 73/504.13 |
| 7,127,946 B2 * | 10/2006 | Renault ....................... 73/504.13 |
| 7,621,184 B2 * | 11/2009 | Caron ......................... 73/504.13 |
| 7,624,494 B2 * | 12/2009 | Challoner et al. .............. 29/595 |
| 8,186,219 B2 * | 5/2012 | Caron et al. ................ 73/504.13 |
| 8,210,023 B2 * | 7/2012 | Jeanroy et al. ................. 73/1.37 |
| 8,490,485 B2 * | 7/2013 | Vandebeuque et al. ..... 73/504.13 |
| 2002/0066317 A1 * | 6/2002 | Lin ............................. 73/504.02 |
| 2003/0029238 A1 * | 2/2003 | Challoner .................. 73/504.04 |
| 2004/0055380 A1 * | 3/2004 | Shcheglov et al. ........ 73/504.12 |
| 2005/0248238 A1 * | 11/2005 | Yamada et al. ................ 310/366 |
| 2007/0084042 A1 | 4/2007 | Challoner et al. |
| 2009/0013770 A1 * | 1/2009 | Proksch et al. .................. 73/105 |
| 2009/0019932 A1 * | 1/2009 | Cardarelli .................. 73/504.02 |
| 2009/0205422 A1 | 8/2009 | Caron et al. |
| 2010/0058831 A1 * | 3/2010 | Jeanroy et al. ................. 73/1.82 |

* cited by examiner

*Primary Examiner* — Laura Martin
*Assistant Examiner* — Samir M Shah
(74) *Attorney, Agent, or Firm* — Muncy, Geissler, Olds & Lowe, P.C.

(57) ABSTRACT

Method of angular measurement by means of a sensor comprising an axisymmetric resonator associated with means for setting the resonator into vibration and with means for detecting an orientation of the vibration with respect to a reference frame of the sensor, comprising the steps of applying a precession control so as to slave an orientation of the vibration to an angular setpoint value and of determining an angular measurement on the basis of the precession control. The method comprises a phase of modulating the angular setpoint value in such a way that the said setpoint value uniformly sweeps an angular span of $\pi$ radians and that a temporal derivative of the setpoint is deducted from the precession control prior to the determination of the angular measurement.

4 Claims, No Drawings

METHOD OF ANGULAR MEASUREMENT BY MEANS OF A VIBRATING SENSOR TO WHICH MODULATED CONTROLS ARE APPLIED

BACKGROUND OF THE INVENTION

Field of the Invention

The present invention relates to a method of angular measurement by means of a sensor of the vibrating gyroscope type.

Such a sensor comprises an axisymmetric resonator associated with means for setting the resonator into vibration and with means for detecting an orientation of the vibration with respect to a reference frame of the sensor. These means comprise respectively at least two groups of actuators (or forcers) secured to the casing of the sensor and/or to the resonator and at least two groups of detectors also secured to the casing and/or to the resonator.

Ideally, the group of the two detectors constitutes an orthonormal reference frame which coincides with the modal base of the mode of vibration adopted to operate the resonator. Likewise, in the ideal case, the group of the two actuators constitutes an orthonormal reference frame which coincides with the modal base of the mode of vibration adopted to operate the resonator.

The signals (representative of the resonator's deformation profile which is engendered by setting the resonator into vibration) observed in the base formed by the detectors describe an elliptical trajectory characterized by its major axis of length p and its minor axis of length q.

$$p \cdot \begin{bmatrix} \cos\theta \\ \sin\theta \end{bmatrix} \cdot \cos\phi + q \cdot \begin{bmatrix} -\sin\theta \\ \cos\theta \end{bmatrix} \cdot \sin\phi$$

$$\dot{\phi} = \omega_0 = 2 \cdot \pi \cdot F_0$$

The electrical angle $\theta$ characterizes the orientation of the vibration in the modal base, the phase $\phi$ is the integral with respect to time of the resonance angular frequency $\omega_0$.

To implement such a sensor, the effect of the damping forces should be compensated so as to keep the amplitude of the vibration constant, this role is entrusted to the maintain control or amplitude control (Ca).

Moreover the frequency anisotropy which causes the eccentricity of the ellipse referred to as quadrature must be cancelled so as to avoid the appearance of drift terms related to the said quadrature, this role is entrusted to the quadrature control (Cq).

The so-called precession control (Cp) and stiffness control (Cr) act respectively on the electrical angle and the phase of the vibration.

This type of sensor can operate according to two modes, namely a gyroscope mode (or whole angle mode) and a gyrometer mode (or rate gyro mode).

In gyroscope mode, the electrical angle is freely entrained by the rotation motions applied to the casing of the apparatus along its responsive axis.

In gyrometer mode, a force termed the precession control (Cp) is applied to the actuators so as to keep the electrical angle constant. This force being proportional to the rate applied along the responsive axis of the sensor constitutes a measurement of the said rate.

Under the effect of production defects, the drift of such a sensor depends on the position of the vibration with respect to the casing of the apparatus and therefore the angle $\theta$. To within the time origin, the ellipse is unchanged when $\theta$ is replaced with $\theta+\pi$, from which it is deduced that the drift, the errors of angular coding in gyroscope mode and the scale factor in gyrometer mode are $\pi$ functions that are periodic in $\theta$. These functions therefore decompose into Fourier series consisting of terms in $\cos(2n\theta)$ and $\sin(2n\theta)$ where n describes the set of natural integers.

In the vicinity of the resonant frequency, the transfer functions of the actuators and detectors are modelled by 2×2 complex gain matrices. The scale factor of the gyrometer is proportional to the product of the gains projected in the direction orthogonal to the vibration, and the errors of angular coding of the gyroscope are proportional to the detection gain anisotropies.

It may be shown that the drift of such a sensor is the sum:
  of the effect of the damping anisotropies;
  of the product of the effects of the detection gain anisotropies and of the maintain control;
  of the product of the effects of the control gain anisotropies and of the maintain control;
  of the product of the effects of the phase shift and of the quadrature control.

When the same electrodes are used alternately as detectors and then as actuators, the detector gain and motor matrices are transposed one with the other. It follows from this that the mean component of the drift (term in $0\theta$ of the Fourier series) is naturally close to zero. The components in $\cos(2\theta)$ and $\sin(2\theta)$ of this drift, which are the main error terms, are variable as a function of temperature.

It is possible to determine the said components so as to establish in the factory, during a procedure for calibrating each sensor, an error model so as to allow compensation of the said errors during the operation of the sensor as a function of the temperatures of use.

On the other hand, it is not possible to take account of the aging of the sensor.

Aging therefore remains a significant source of instability.

SUMMARY OF THE INVENTION

An aim of the invention is to provide a means for improving the performance of sensors of this type.

For this purpose, there is provided, according to the invention, a method of angular measurement by means of a sensor comprising an axisymmetric resonator associated with means for setting the resonator into vibration and with means for detecting an orientation of the vibration with respect to a reference frame tied to the casing of the sensor and/or to the resonator, comprising the steps of applying a precession control so as to slave an orientation of the vibration to an angular setpoint value and of determining an angular measurement on the basis of the precession control. The method comprises a phase of modulating the angular setpoint value in such a way that the said setpoint value uniformly sweeps an angular span of $k\pi$ radians, k being an integer, in one direction and then in the opposite direction and in that a temporal derivative of the setpoint is deducted from the precession control prior to the determination of the angular measurement.

In the case of a sensor operating conventionally as a gyrometer, the precession control is applied so as to slave the orientation of the vibration (or electrical angle) to a constant setpoint value. The precession control then compensates the sum of the drift and of the angular rate applied along the responsive axis of the sensor, with a scale factor error which depends on the gains of the means for setting into vibration and the detection means.

The invention consists in modulating the angular setpoint uniformly between two values spaced apart by $k\pi$ radians where k is an integer. To the "conventional" gyrometer precession control is then added the temporal derivative of the angular setpoint marred by the scale factor precession error. The expression uniform sweep is understood to mean an angular trajectory such that the time spent on average on angular sectors, of substantially equal (for example to within 10%) width, taken from the angular span, is identical.

The determination of the angular measurement is then carried out on the basis of the precession control from which the temporal derivative of the angular slaving setpoint is deducted. The angular measurement is a mean of the values thus calculated. The electrical angle being imposed, the time averages coincide with the angle averages.

According to a particular characteristic, the method comprises a step of fitting an error model for the sensor and, preferably, the step of also applying a quadrature control, an amplitude control and a stiffness control, the fitting being carried out by modulating at least one of the said controls during the sweep and by observing a trend in the vibration in response to this modulation.

Thus, the sweep of the angular span by the vibration is exploited to fit the error model of the gyroscope during use by superimposing appropriate disturbances on the gyroscope controls and observing their effect on the vibration. This makes it possible to identify and compensate all or part:
 of the gain error and phase error of the detectors and motors;
 of the couplings between the means of setting into vibration and the detection means;
 of the anisotropies of damping and of stiffness.

Other characteristics and advantages of the invention will emerge on reading the description which follows of a particular nonlimiting mode of implementation of the invention.

DETAILED DISCUSSION OF THE PREFERRED EMBODIMENTS

The method of the invention is implemented by means of a sensor with vibrating resonator of conventional type.

Such a sensor, of vibrating gyroscope type, comprises a casing in which is mounted a vibrating axisymmetric resonator associated with means for setting the resonator into vibration and with means for detecting an orientation of the vibration in a reference frame of the sensor. The means of setting into vibration and the detection means may be of piezoelectric or electrostatic type. These means comprise electrodes which are linked to a processing circuit so as to be used here alternately for setting the resonator into vibration and for detecting the orientation of the vibration with respect to the reference frame of the sensor.

The structure of the sensor is conventional and will not be described in greater detail here.

The general operating principle of the angular measurement by means of such a sensor consists in setting the resonator into vibration by causing a deflection profile of the latter in the form of an ellipse exhibiting a major axis and in detecting the orientation of this major axis in the reference frame of the sensor.

The setting into vibration is obtained by applying electrical signals to the electrodes. These electrical signals consist of a superposition of controls.

The amplitude control (Ca) is determined so as to compensate the effect of the damping forces in such a way as to keep the amplitude of the vibration constant.

The quadrature control (Cq) is determined so as to eliminate an eccentricity of the ellipse referred to as quadrature caused by a frequency anisotropy, in such a way as to avoid the appearance of drift terms related to the said quadrature.

The precession control (Cp) acts on the electrical angle, that is to say on the orientation of the major axis of the vibration.

The stiffness control (Cr) acts on the phase of the vibration.

For the implementation of the method in accordance with the invention, the sensor is used in gyrometer mode.

In gyrometer mode, the precession control (Cp) applied to the actuators creates a force keeping the orientation of the vibration or electrical angle at a predetermined value. This force being proportional to the angular rate applied along the responsive axis of the sensor constitutes a measurement of the said rate.

In this mode of operation, the method of angular measurement thus comprises the steps of applying a precession control so as to slave an orientation of the vibration to an angular setpoint value and of determining an angular measurement on the basis of the precession control.

In the method of the invention, the setpoint value is not constant but modulated in such a way that it uniformly sweeps an angular span of $k\pi$ radians in one direction and then in the opposite direction with k an integer. Preferably, the angular span equals $\pi$ radians.

The angular rate measurement is determined by deducting the temporal derivative of the angular setpoint from the precession control.

The method of the invention furthermore comprises a step of fitting an error model for the sensor, this fitting step being carried out periodically, for example at preprogrammed time intervals, during the use of the sensor.

The error model comprises parameters representing: mean damping, damping anisotropy, frequency anisotropy, scale factor error, detectors/actuators lag, gain anisotropy, mean phase lag, phase lag anisotropy.

The fitting is carried out by modulating at least one of the said controls during the sweep and by observing a trend in the vibration in response to this modulation.

The precession control is modulated so as to perform the uniform sweep and the stiffness control is advantageously modulated so as to render the error model observable on account of the disturbances that the modulation will engender. As the stiffness control is hardly used in the normal operation of the sensor, its use within the context of the fitting does not affect the normal response of the sensor.

It would also be possible to use the amplitude control and/or the quadrature control whose influence is more significant, but it would then be necessary to take account of the fact that the amplitude and/or the quadrature of the vibration is no longer constant, thereby complicating the processing of the observations with a view to identifying and compensating the parameters of the error model.

The parameters of the error model to be identified and compensated are:
 three parameters in connection with the mechanical damping of the sensor represented by a real 2×2 symmetrical matrix,
 three parameters in connection with the frequency of the resonator represented by a real 2×2 symmetrical matrix with a null trace (two parameters concerning frequency anisotropy and one parameter concerning the average frequency of the resonator during one complete revolution of the vibration), eight parameters in connection with the gain errors of the detectors represented by a complex 2×2 symmetrical matrix (taking into account phase lag), eight parameters in connection with the gain errors of the actuators represented by a complex 2×2 symmetrical matrix (taking into account phase lag).

To reduce the number of the parameters to be identified and compensated, the same transducers are used alternately as detectors and as actuators. The last sixteen parameters are thus replaced by eight parameters in connection with the gain errors of the transducers and one parameter in connection with scale factor error.

The modulation of the stiffness control during the uniform sweep enables an identification of the parameters and a recalculation of the error model in order to compensate the aging of the sensor.

It will be noted that the compensation of the parameters of the error model is performed in a conventional manner and is all the easier as, these parameters varying little in the short term, time is available to perform the compensation.

The method of the invention thus uses an axisymmetric vibrating gyroscope in a particular operating mode making it possible to identify and compensate the sensor's drift error and scale factor error during its use.

This is obtained by slaving the vibration to a variable angular setpoint uniformly sweeping over time an angular sector of $\pi$ rads and by injecting known disturbances onto the controls of the resonator so as to identify and compensate for the trend in the error terms independently of the motions of the support.

Then, the matrices related to damping, gain and phase errors are compensated.

Besides, the mean value of bias versus angle is null. As the user is more interested by mean value versus time than versus angle, it is preferable to ensure that mean value versus angle coincides with mean value versus time. To this end, the setpoint value has to be uniformly distributed over a range of $\pi$ or $k\pi$, k being an integer. The simplest way to obtain such a distribution is to change the setpoint value linearly in time. The setpoint value is linearly changed in time in one direction and in the opposite one in order to have a null mean value of the bias due to the scale factor error.

Of course, the invention is not limited to the embodiments described but encompasses any variant entering the field of the invention such as defined by the claims.

In particular, the invention is applicable to angular sensors of any type and in particular whatever the shape of the axisymmetric resonator.

The present invention is described in the particular case where only two detectors and two actuators are used, but the method applies to the more general case where the electrodes are more numerous.

The electrodes may be secured to the casing and to the resonator, or only to the resonator.

The gyroscope is for example a hemispherical resonator gyroscope or a gyroscope of the QUAPASON type.

The detectors and the actuators may be of the electrostatic, magnetic or piezoelectric types.

The invention claimed is:

1. A method of angular measurement by a sensor comprising an axisymmetric resonator associated with means for setting the resonator into vibration and with means for detecting an orientation of the vibration with respect to a reference frame tied to a casing of the sensor and/or to the resonator, the method comprising: the steps of applying a precession control so as to slave the orientation of the vibration to an angular setpoint value;

determining an angular measurement on basis of the precession control;

modulating the angular setpoint value in such a way that the setpoint value uniformly sweeps an angular span of $k\pi$ radians, k being an integer, in one direction and then in the opposite direction, wherein a temporal derivative of the setpoint is deducted from the precession control prior to the determination of the angular measurement.

2. The method according to claim 1, further comprising fitting an error model for the sensor.

3. The method according to claim 2, further comprising applying a quadrature control, an amplitude control and a stiffness control, the fitting being carried out by modulating at least one of the controls during the sweep and by observing a trend in the vibration in response to this modulation.

4. The method according to claim 3, wherein at least one of the modulated controls for the fitting is the stiffness control.

* * * * *